Aug. 5, 1952 — A. J. ZORANOVICH — 2,605,811
CHILD'S AUTOMOBILE CHAIR
Filed Nov. 18, 1949
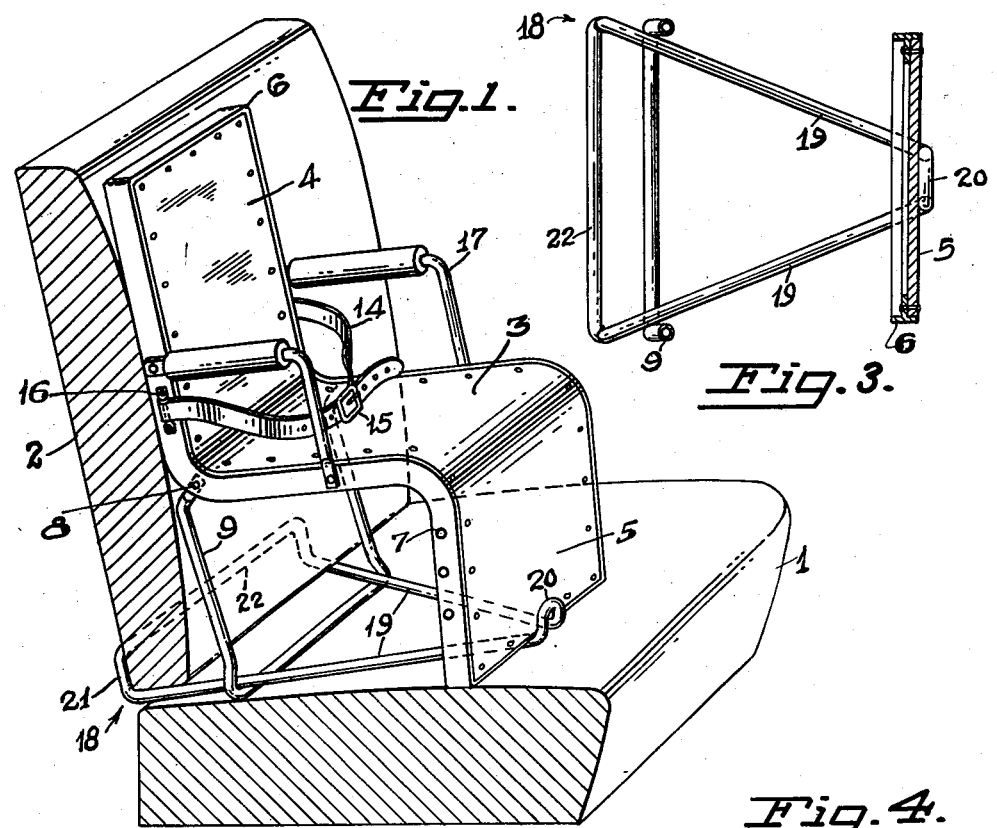
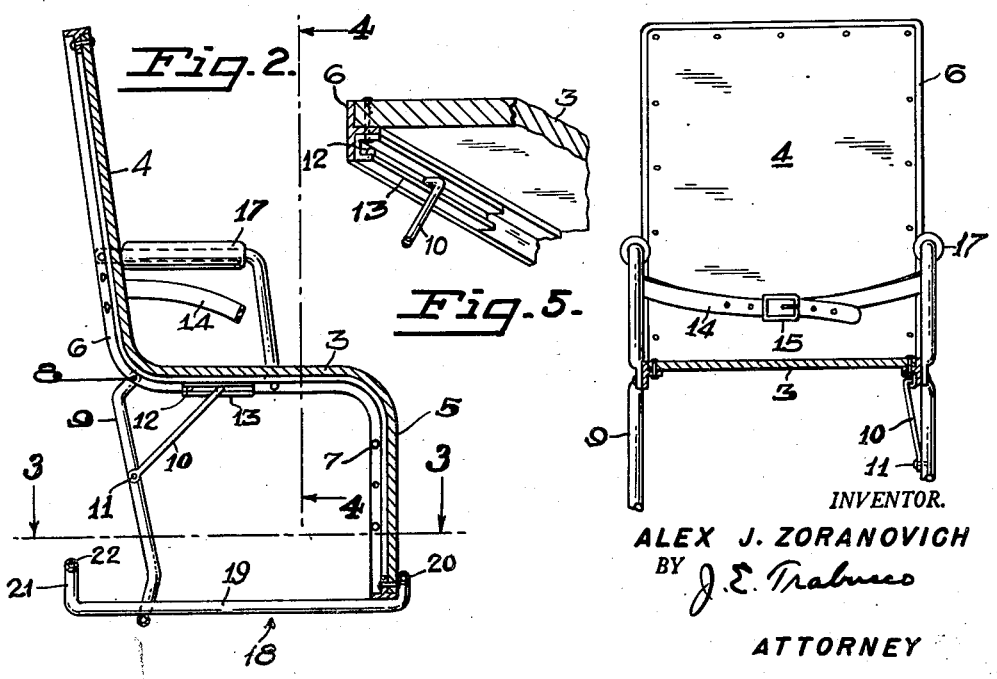
INVENTOR.
ALEX J. ZORANOVICH
BY J. E. Trabucco
ATTORNEY Patented Aug. 5, 1952

2,605,811

UNITED STATES PATENT OFFICE 2,605,811

CHILD'S AUTOMOBILE CHAIR

Alex J. Zoranovich, San Mateo, Calif.

Application November 18, 1949, Serial No. 128,042

6 Claims. (Cl. 155—11)

This invention relates to a child's auxiliary automobile chair.

The present invention provides a child's chair which is capable of being securely supported on an automobile seat. Associated with the child's chair is a base member of substantially triangular shape which provides a novel locking element for securely holding the chair in an operative position on an automobile seat. The base member is so arranged with respect to the child's chair and the automobile seat on which it is supported that irrespective of the pressure applied when the automobile stops or starts the chair will not become displaced from its normal supporting position. A child seated on and suitably strapped to the chair will not be in danger of falling in the event the automobile is suddenly started or stopped.

The primary object of the present invention is to provide a novel child's chair of the kind characterized which, in combination with a locking element, is adapted to securely support a child in a raised position on an automobile seat.

For the purposes of this application I have elected to show herein certain forms and details of a child's automobile chair representative of my invention. It is to be understood, however, that the embodiment of my invention herein shown and described is for the purpose of illustration only and that therefore it is not to be regarded as exhaustive of the variations of the invention in the art.

In the accompanying drawings:

Fig. 1 is a perspective view of a child's chair of the type embodying the present invention, supported on an automobile seat;

Fig. 2 is a vertical sectional view taken centrally through the child's chair;

Fig. 3 is a sectional view taken on the line 3—3 of Fig. 2;

Fig. 4 is a sectional view taken on the line 4—4 of Fig. 2; and

Fig. 5 is an enlarged perspective view of a portion of the chair seat, showing the manner in which the rear chair leg is held in a rigid supporting position when the chair is used independently of the automobile seat.

Referring to the drawings the numeral 1 designates an automobile seat, and 2 the back portion thereof.

The child's chair comprises a substantially horizontal seat portion 3 having an upstanding back portion 4 secured to its rear edge. Depending from the forward edge of the seat portion 3 is a front leg 5 of suitable shape and construction which, for illustration purposes, is shown as comprising a one piece member having a width corresponding substantially with that of the seat portion. Secured as by rivets to the seat and back portions of the child's chair is a metal edging 6 which is substantially T-shaped in cross section. The side portions of the metal edging 6 at points adjacent the front leg 5 are preferably provided with vertically spaced openings 7 for receiving projecting members which may be employed in supporting the child's chair on a suitable supporting structure, as disclosed in my co-pending patent application filed May 25, 1948, Serial No. 28,981, entitled "Combination Child's Chair."

Hinged as at 8 to the edging 6 at points beneath the seat 3 where the latter curves upwardly is a substantially U-shaped rear leg 9. A brace member 10 pivotally connected as at 11 to the rear leg 9 is adapted to engage with an opening 12 in a channeled guide member 13 when the said rear leg is swung backwardly to a position in which it is adapted to support the chair on a supporting surface other than the automobile seat 1.

A strap 14 provided with a buckle 15 is secured by suitable means such as brackets 16 to the back portion 4 of the child's chair. Suitable arm rests 17 are secured to the metal edging 6 at points adjacent the seat 3 and the back 4.

The means preferably used for securely holding the child's chair against displacement when supported on the automobile seat 1 is a rigid base member 18 of substantially triangular shape which is preferably made from metal tubing. The base member 18 comprises forwardly converging side portions 19 which are bent upwardly at their forward joined ends as at 20. The rear ends of the converging side portions 19 extend upwardly as at 21, and joining the upper ends of the latter is a transverse portion 22. The rear enlarged end of the base member 18 is somewhat wider than the rear leg 9, thereby making it possible for the sides of the said leg to engage with the converging portions 19 of the base member 18. The rear leg 9 being in engagement with the side portions 19 of the base member, prevents the sidewise displacement of the child's chair with respect to the base member.

In operation the base member 18 is first arranged in a supported position on the seat portion 1 of the automobile seat with the rearwardly disposed upturned parts 21 of the side portions 19 hooked under the lower edge of the back portion 2. The transverse portion of the U-shaped rear leg 9 of the child's chair is slid rearwardly beneath the base member 18 as the child's chair is arranged with its back portion 4 abutting the back 2 of the automobile seat and its front leg 5 resting on the base member. When so positioned the child's chair is prevented from shifting rearwardly by the back 2 of the automobile seat, while at the same time the upturned forward end 20 of the base member 18 engaging with the front leg 5 of the child's chair prevents the said chair from shifting forwardly. Since the U-shaped leg 9 of the child's chair is locked under the base member 18 the child's chair cannot tip forwardly, irrespective of whether the automobile might come to a sudden stop. It is to be noted that the base member 18 being locked under the back 2 of the automobile seat cannot shift forwardly even though a considerable pressure in a forward direction might be exerted thereon by the child's chair when the automobile comes to an abrupt stop. The child's chair is thus securely supported on the automobile seat in a normal operative position.

What I claim is:

1. In combination with a vehicle seat having a back, a child's chair having a seat portion, a rigid back portion, a rigid front leg and a pivoted rear leg, the said child's chair being supported on the vehicle seat with its rigid back portion abutting the said back, and a base member resting on the vehicle seat and having a rear portion hooked under the back of the vehicle seat and an upturned forward portion, the said child's chair being normally arranged with its pivoted rear leg hooked under the base member and its front leg abutting the rear side of the upturned forward portion of the said base member.

2. In combination with a vehicle seat having a back, a child's chair having a seat portion, a rigid back portion, a rigid front leg and a rear leg, the said child's chair being detachably supported on the vehicle seat with its rigid back portion abutting the said back, and a base member having an upturned forward end engaging with the front leg, and the said base member having a hooked rear portion embracing the back portion of the automobile seat.

3. In combination with a vehicle seat having a back, a child's chair supported on the seat and having a seat portion, a rigid back portion, a rigid front leg and a pivoted rear leg, and a base member secured on the vehicle seat and having means extending upwardly in front of and in engagement with the front leg of the child's chair, whereby the child's chair is prevented from shifting forwardly with respect to the vehicle seat.

4. In combination with a vehicle seat having a back, a child's chair supported on the seat and having a seat portion, a rigid back portion, a rigid front leg and a U-shaped rear leg, the said rear leg having a lower side resting on the vehicle seat, and a base member secured on the vehicle seat and having a portion extending over the bight portion of the rear leg and also having a forward portion extending upwardly in front of and in engagement with the front leg of the child's chair.

5. In combination with a vehicle seat having a back, a child's chair supported on the vehicle seat and having a seat portion, a rigid back portion, a rigid front leg and a substantially U-shaped rear leg having a lower side resting on the automobile seat, and a base member of substantially triangular shape resting on the vehicle seat and having an off set rear portion arranged in hooked engagement with the vehicle seat and an upturned forward end positioned in front of and in engagement with the front leg of the child's chair, the said base member extending over the lower side of the bight portion of the U-shaped rear leg of the child's chair.

6. In a child's chair, a one piece rigid structure comprising a seat portion, a back portion and a front leg, a metal edging of substantially T-shape in cross section extending around the edges of the said portions, a pivoted rear leg connected to the metal edging at points beneath the seat portion, and a plurality of vertically spaced side openings in the edging at the side edges of the front leg.

ALEX J. ZORANOVICH.

REFERENCES CITED

The following references are of record in the file of this patent:

UNITED STATES PATENTS

| Number | Name | Date |
|---|---|---|
| 1,029,807 | Hinsky | June 18, 1912 |
| 1,747,831 | Hess | Feb. 18, 1930 |